(12) United States Patent
Liu et al.

(10) Patent No.: US 11,568,671 B2
(45) Date of Patent: Jan. 31, 2023

(54) FINGERPRINT RECOGNITION DETECTION CIRCUIT AND CONTROL METHOD THEREOF, FINGERPRINT RECOGNITION CONTROL CHIP

(71) Applicants: Beijing BOE Sensor Technology Co., Ltd., Beijing (CN); BOE TECHNOLOGY GROUP CO., LTD., Beijing (CN)

(72) Inventors: Binbin Liu, Beijing (CN); Chen Meng, Beijing (CN); Wei Shi, Beijing (CN); Wenjie Zhong, Beijing (CN); Zhong Hu, Beijing (CN); Yongbo Wang, Beijing (CN); Zhenghua Lu, Beijing (CN); Dahai Hu, Beijing (CN); Guo Liu, Beijing (CN); Guoan Wang, Beijing (CN); Jiarong Liu, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 135 days.

(21) Appl. No.: 17/261,993

(22) PCT Filed: Apr. 10, 2020

(86) PCT No.: PCT/CN2020/084220
§ 371 (c)(1),
(2) Date: Jan. 21, 2021

(87) PCT Pub. No.: WO2021/203418
PCT Pub. Date: Oct. 14, 2021

(65) Prior Publication Data
US 2022/0114827 A1      Apr. 14, 2022

(51) Int. Cl.
*G06V 40/13*      (2022.01)

(52) U.S. Cl.
CPC ...... *G06V 40/1306* (2022.01); *G06V 40/1329* (2022.01)

(58) Field of Classification Search
CPC .................. G06V 40/1306; G06V 40/1329
See application file for complete search history.

(56) References Cited

U.S. PATENT DOCUMENTS

2018/0089489 A1*   3/2018   Liang ................. H03M 1/00
2018/0089490 A1*   3/2018   Liang ................. G06V 40/1306

FOREIGN PATENT DOCUMENTS

CN       101526988           9/2009
CN       102523394 A    *    6/2012
(Continued)

OTHER PUBLICATIONS

PCT International Search Report for corresponding PCT Application No. PCT/CN2020/084220, dated Jan. 12, 2021, 10 pages.

*Primary Examiner* — Edward F Urban
*Assistant Examiner* — Wassim Mahrouka
(74) *Attorney, Agent, or Firm* — Dority & Manning, P.A.

(57) ABSTRACT

A fingerprint recognition detection circuit includes an operational amplifier, an integrating capacitor and a first switch connected in series, and a second switch. A non-inverting input terminal of the operational amplifier is coupled to a reference voltage terminal, and an inverting input terminal of the operational amplifier is coupled to a fingerprint sensing capacitor. The integrating capacitor and the first switch are coupled between the inverting input terminal of the operational amplifier and an output terminal of the operational amplifier. The second switch is coupled between the inverting input terminal of the operational amplifier and the output terminal of the operational amplifier.

18 Claims, 5 Drawing Sheets

(56) References Cited

FOREIGN PATENT DOCUMENTS

| CN | 106557724 | | 4/2017 |
| CN | 207133803 U | * | 3/2018 |
| CN | 210142336 | | 3/2020 |
| CN | 210142336 U | * | 3/2020 |

* cited by examiner

FINGERPRINT RECOGNITION DETECTION CIRCUIT AND CONTROL METHOD THEREOF, FINGERPRINT RECOGNITION CONTROL CHIP

CROSS-REFERENCE TO RELATED APPLICATIONS

This application is a national phase entry under 35 USC 371 of International Patent Application No. PCT/CN2020/084220 filed on 10 Apr. 2020, which is incorporated herein by reference in its entirety.

TECHNICAL FIELD

The present disclosure relates to the field of display technologies, and in particular, to a fingerprint recognition detection circuit and a control method thereof, a fingerprint recognition control chip, a fingerprint recognition apparatus and a fingerprint lock.

BACKGROUND

Fingerprint recognition technologies have been widely used in fingerprint locks, attendance machines, smart phones and other products. At present, capacitive fingerprint recognition technology has a problem of vertical line noise, which affects an accuracy of fingerprint recognition.

SUMMARY

In an aspect, a fingerprint recognition detection circuit is provided. The fingerprint recognition detection circuit includes an operational amplifier, an integrating capacitor and a first switch connected in series, and a second switch. A non-inverting input terminal of the operational amplifier is coupled to a reference voltage terminal, and an inverting input terminal of the operational amplifier is coupled to a fingerprint sensing capacitor. The integrating capacitor and the first switch are coupled between the inverting input terminal of the operational amplifier and an output terminal of the operational amplifier. The second switch is coupled between the inverting input terminal of the operational amplifier and the output terminal of the operational amplifier, and the second switch is connected in parallel with the integrating capacitor and the first switch connected in series.

The integrating capacitor is configured to discharge when the first switch is opened and the second switch is closed, and to store charges under an action of the fingerprint sensing capacitor when the second switch is opened and the first switch is closed. The operational amplifier is configured to output a detection signal representing a capacitance value of the fingerprint sensing capacitor under an action of the integrating capacitor.

In some embodiments, the first switch includes a first transistor. A control electrode of the first transistor is coupled to a first control signal terminal, a first electrode of the first transistor is coupled to the inverting input terminal of the operational amplifier, and a second electrode of the first transistor is coupled to the integrating capacitor.

In some embodiments, the first switch includes a first transistor. A control electrode of the first transistor is coupled to a first control signal terminal, a first electrode of the first transistor is coupled to the integrating capacitor, and a second electrode of the first transistor is coupled to the output terminal of the operational amplifier.

In some embodiments, the second switch includes a second transistor. A control electrode of the second transistor is coupled to a second control signal terminal, a first electrode of the second transistor is coupled to the inverting input terminal of the operational amplifier, and a second electrode of the second transistor is coupled to the output terminal of the operational amplifier.

In some embodiments, a first terminal of the fingerprint sensing capacitor is coupled to a drive signal terminal, and a second terminal of the fingerprint sensing capacitor is coupled to the inverting input terminal of the operational amplifier. The fingerprint recognition detection circuit further includes a compensation capacitor. A first terminal of the compensation capacitor is coupled to a compensation signal terminal, and a second terminal of the compensation capacitor is coupled to the inverting input terminal of the operational amplifier. A compensation signal from the compensation signal terminal received by the first terminal of the compensation capacitor has an opposite phase to a drive signal from the drive signal terminal received by the first terminal of the fingerprint sensing capacitor. The compensation capacitor is configured to offset at least a part of an original capacitance value of the fingerprint sensing capacitor. The original capacitance value is a capacitance value of the fingerprint sensing capacitor when not affected by a fingerprint.

In some embodiments, a capacitance value of the compensation capacitor is equal to the original capacitance value of the fingerprint sensing capacitor.

In another aspect, a fingerprint recognition control chip is provided. The fingerprint recognition control chip includes at least one fingerprint recognition detection circuit as described above.

In some embodiments, the fingerprint recognition control chip further includes a timing control circuit. The timing control circuit has a plurality of drive signal terminals, and each drive signal terminal is coupled to at least one fingerprint sensing capacitor. The timing control circuit is configured to generate a drive signal, and transmit the drive signal to the at least one fingerprint sensing capacitor through the drive signal terminal.

In some embodiments, in a case where the fingerprint recognition detection circuit further includes a compensation capacitor, the timing control circuit further has a compensation signal terminal. The timing control circuit is further configured to generate a compensation signal, and transmit the compensation signal to the compensation capacitor of the fingerprint recognition detection circuit through the compensation signal terminal.

In some embodiments, in a case where the fingerprint recognition circuit includes a first transistor and a second transistor, the timing control circuit further has a first control signal terminal and a second control signal terminal. The timing control circuit is further configured to generate a first control signal and a second control signal, and transmit the first control signal to the first transistor through the first control signal terminal and the second control signal to the second transistor through the second control signal terminal.

In some embodiments, the fingerprint recognition control chip further includes a voltage generator. The voltage generator has a reference voltage terminal. The voltage generator is configured to generate a reference voltage signal, and transmit the reference voltage signal to the non-inverting input terminal of the operational amplifier of the fingerprint recognition detection circuit through the reference voltage terminal.

In some embodiments, the fingerprint recognition control chip further includes: at least one filter, at least one comparator, and at least one counter. One filter, one comparator and one counter are sequentially connected in series, and the filter is coupled to the output terminal of the operational amplifier of the fingerprint recognition detection circuit. The filter is configured to denoise a detection signal output by the fingerprint recognition detection circuit. The comparator is configured to compare a voltage value of a signal output by the filter with a preset voltage value, and to output an enable signal if the voltage value of the signal output by the filter is larger than the preset voltage value. The counter is configured to stop counting and output a counting result under control of the inversion signal.

In some embodiments, the fingerprint recognition control chip further includes a signal processing circuit. The signal processing circuit is coupled to the counter. The signal processing circuit is configured to process the counting result output by the counter, and to output a voltage signal representing fingerprint image data.

In yet another aspect, a fingerprint recognition apparatus is provided. The fingerprint recognition apparatus includes: a sensing substrate and the fingerprint recognition control chip described above. The sensing substrate has a plurality of sensing regions. Each sensing region is provided therein with at least one fingerprint sensing capacitor, and each fingerprint sensing capacitor is coupled to the fingerprint recognition control chip. The fingerprint sensing capacitor is configured to sense a change in a capacitance caused by a valley or ridge in a fingerprint.

In some embodiments, the plurality of sensing regions are arranged in an array. The sensing substrate includes: a base substrate, a plurality of first electrodes and a plurality of second electrodes. The plurality of first electrodes are arranged on a side of the base substrate, and the plurality of first electrodes extend in a first direction and are arranged at intervals in a second direction. The plurality of second electrodes are arranged on sides of the plurality of first electrodes away from the base substrate, and the plurality of second electrodes extend in the second direction and are arranged at intervals in the first direction. The plurality of first electrodes and the plurality of second electrodes are insulated from each other; and a plurality of fingerprint sensing capacitors are formed at intersections of the plurality of first electrodes and the plurality of second electrodes. The first direction intersects the second direction.

In some embodiments, the first electrode is coupled to the inverting input terminal of the operational amplifier of the fingerprint recognition detection circuit in the fingerprint recognition control chip.

In some embodiments, in a case where the fingerprint recognition control chip further includes a timing control circuit, the plurality of second electrodes are coupled with the timing control circuit. The timing control circuit is configured to transmit drive signals to the plurality of second electrodes row by row.

In some embodiments, the sensing substrate further includes: a first insulating layer arranged between the plurality of first electrodes and the plurality of second electrodes, a second insulating layer arranged on sides of the plurality of second electrodes away from the base substrate, and a third electrode layer arranged on a side of the second insulating layer away from the base substrate.

In yet another aspect, a control method of a fingerprint recognition detection circuit is provided. The control method is applied to the fingerprint recognition detection circuit as described above and includes: opening the first switch and closing the second switch, so that the fingerprint recognition detection circuit is in a reset state, and the integrating capacitor of the fingerprint recognition detection circuit is discharged; and opening the second switch and closing the first switch, so that the fingerprint recognition detection circuit is in an integration state, the integrating capacitor of the fingerprint recognition detection circuit stores charges under the action of the fingerprint sensing capacitor, and the operational amplifier outputs the detection signal representing the capacitance value of the fingerprint sensing capacitor under the action of the integrating capacitor.

In yet another aspect, a fingerprint lock is provided. The fingerprint lock includes a lock body, the fingerprint recognition apparatus as described above, and a main control board. The lock body and the fingerprint recognition apparatus are respectively coupled to the main control board, and the main control board is configured to receive voltage information representing fingerprint image data from the fingerprint recognition apparatus, to generate a fingerprint image according to the voltage information, and to compare the generated fingerprint image with an original fingerprint image to determine whether to unlock or not.

BRIEF DESCRIPTION OF THE DRAWINGS

In order to describe technical solutions in the present disclosure more clearly, accompanying drawings to be used in some embodiments of the present disclosure will be introduced briefly. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and an actual timing of a signal involved in the embodiments of the present disclosure.

FIG. 2B is a diagram showing another structure of a fingerprint recognition circuit, according to some embodiments of the present disclosure;

DETAILED DESCRIPTION

Figure 1:
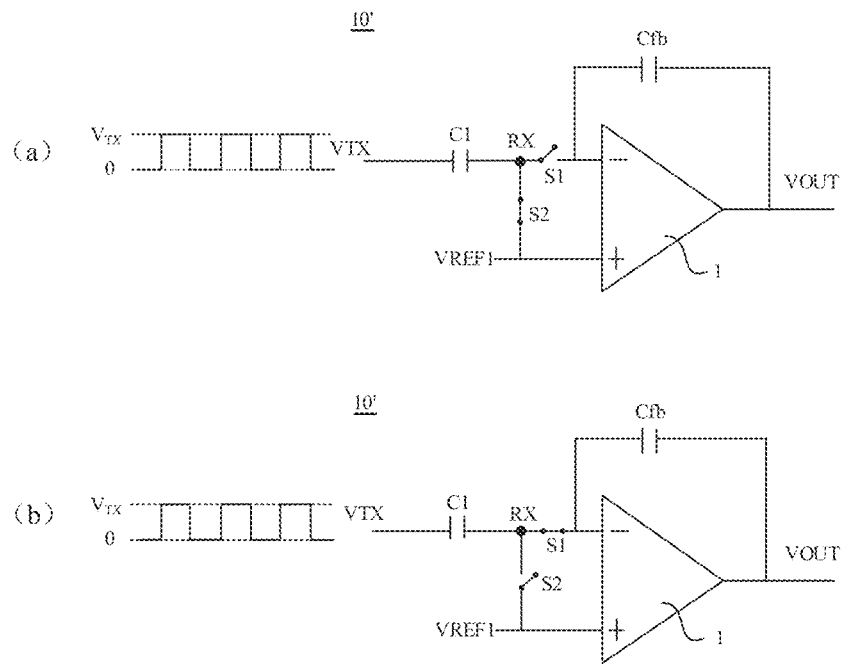
FIG. 1 is a diagram showing a structure of a fingerprint recognition detection circuit, according to some embodiments of the related art.

Technical solutions in some embodiments of the present disclosure will be described clearly and completely below with reference to the accompanying drawings. Obviously, the described embodiments are merely some but not all embodiments of the present disclosure. All other embodiments obtained on the basis of the embodiments provided in the present disclosure by a person of ordinary skill in the art shall be included in the protection scope of the present disclosure.

Unless the context requires otherwise, the term "comprise" and other forms thereof such as the third-person singular form "comprises" and the present participle form "comprising" throughout the description and the claims are construed in open and inclusive, i.e., "include, but not limited to". In the description, the terms such as "one embodiment", "some embodiments", "exemplary embodiments", "example", "specific example", or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, terms such as "first" and "second" are used for descriptive purposes only, and are not to be construed as indicating or implying a relative importance or implicitly indicating the number of indicated technical features. Thus, features defined as "first" and "second" may explicitly or implicitly include one or more of the features. In the description of the embodiments of the present disclosure, the term "a plurality of/the plurality of" means two or more unless otherwise specified.

In the description of some embodiments, terms such as "coupled" and "connected" and their extensions may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more elements are not in direct contact with each other, but still cooperate or interact with each other. The embodiments disclosed herein are not necessarily limited to the content herein.

The use of "applicable to" or "configured to" in the present disclosure has an open and inclusive meaning, which does not exclude apparatuses that are applicable to or configured to perform additional tasks or steps.

A capacitive fingerprint recognition apparatus includes a fingerprint sensor and a fingerprint recognition control chip. The fingerprint sensor includes a plurality of fingerprint sensing capacitors arranged in an array, and the fingerprint recognition control chip includes a plurality of fingerprint recognition detection circuits. Each fingerprint sensing capacitor is correspondingly coupled to a fingerprint recognition detection circuit. A capacitance value of the fingerprint sensing capacitor can be changed by an influence of a finger, and a valley and a ridge of the fingerprint have different effects on the fingerprint sensing capacitor. For example, when the finger touches the fingerprint sensor, the capacitance value of each fingerprint sensing capacitor will decrease, and the capacitance value of the fingerprint sensing capacitor corresponding to the ridge is smaller than the capacitance value of the fingerprint sensing capacitor corresponding to the valley. Each fingerprint recognition detection circuit senses a change in the capacitance value of the fingerprint sensing capacitor to which the fingerprint recognition detection circuit is coupled, outputs a detection signal representing the capacitance value of the fingerprint sensing capacitor, and forms a fingerprint image according to voltage values of respective detection signals, thereby achieving fingerprint recognition.

In the related art, as shown in FIG. 1, the fingerprint recognition detection circuit 10' includes an operational amplifier 1, an integrating capacitor Cfb, a first switch S1 and a second switch S2.

The integrating capacitor Cfb is coupled between an inverting input terminal and an output terminal of the operational amplifier 1; a non-inverting input terminal of the operational amplifier 1 is coupled to the reference voltage terminal VREF1; the first switch S1 is coupled between the fingerprint sensing capacitor C1 and the inverting input terminal of the operational amplifier 1, and the first switch S1 is coupled between the reference voltage terminal VREF1 and the inverting input terminal of the operational amplifier 1. A terminal of the fingerprint sensing capacitor C1 receives a drive signal VTX. For example, the drive signal VTX is a square wave signal with a duty ratio of 50%, and levels of the square wave signal alternate between a first level (0V) and a second level (VTX).

A working process of the fingerprint recognition detection circuit 10' is as follows. An entire detection phase includes repeated reset phase and integration phase. In the reset phase (as shown in (a) of FIG. 1), the first switch S1 is opened and the second switch S2 is closed, so that the integrating capacitor Cfb is discharged, and the fingerprint sensing capacitor C1 is charged. In the integration phase (as shown in (b) of FIG. 1), the first switch S1 is closed and the second switch S2 is opened, so that the fingerprint sensing capacitor C1 discharges to the integrating capacitor Cfb. That is, the fingerprint sensing capacitor C1 transfers charges to the integrating capacitor Cfb, and the integrating capacitor Cfb is in a charge storage state.

Under ideal conditions (that is, without considering errors, resistance, parasitic capacitance, etc.), an amount of charges Q(Cfb right) at a second terminal (right terminal) of the integrating capacitor Cfb is equal to a product of a voltage Vout at the output terminal of operational amplifier 1 and the capacitance value Cfb of the integrating capacitor Cfb, i.e., Q(Cfb right)=Vout×Cfb; an amount of charges Q(Cfb left) at a first terminal (left terminal) of the integrating capacitor Cfb is equal to an amount of charges transferred from the fingerprint sensing capacitor C1 to the integrating capacitor Cfb; and an amount of charges of the fingerprint sensing capacitor C1 is equal to a product of a high level VTX of the drive signal and the capacitance value of the fingerprint sensing capacitor. Therefore, the amount of charges Q(Cfb left) at the first terminal of the integrating capacitor Cfb is Q(Cfb left)=VTX×C1.

Since the amount of charges at both terminals of the capacitor is equal, Q(Cfb right)=Vout×Cfb=Q(Cfb left)=VTX×C1. Therefore, for each integration, a voltage at the output terminal of the operational amplifier 1 is: Vout=VTX×C1/Cfb, which is called an integration step and is used as a detection signal representing the capacitance value of the fingerprint sensing capacitor C1. A voltage of the detection signal is related to the capacitance value of the fingerprint sensing capacitor C1, therefore it can reflect whether a corresponding position is a valley or a ridge of a fingerprint.

In practical applications, since the operational amplifier 1 is composed of multiple transistors, in a fabrication process of the operational amplifier 1, due to a low precision of the process, there will be a process voltage drop in the operational amplifier 1, and therefore there will be a weak resistance on a wire coupling the inverting input terminal of the operational amplifier 1 to the fingerprint sensing capacitor C1. For convenience of description, all resistances on the wire is concentrated on a RX node at the right terminal of the fingerprint sensing capacitor C1, and there is a parasitic capacitance Cload as well as a mismatch voltage VRX at the RX node.

In this way, the amount of charges Q(Cfb right) at the right terminal of the integrating capacitor Cfb is still Vout×Cfb. And in the integration phase, an amount of charges Q1 of the fingerprint sensing capacitor C1 and an amount of charges Q2 of the parasitic capacitance are transferred to the first terminal of the integrating capacitor Cfb. The amount of charges Q(Cfb left) at the left terminal of the integrating capacitor Cfb is equal to a sum of the amount of charges Q1 of the fingerprint sensing capacitor C1 and the amount of charges Q2 of the parasitic capacitance. The amount of charges Q1 of the fingerprint sensing capacitor C1 is equal to a product of the high level of the drive signal VTX and the capacitance value C1 of the fingerprint sensing capacitor, and the amount of charges Q2 of the parasitic capacitance is equal to a product of the mismatch voltage VRX and a capacitance value Cload of the parasitic capacitance Cload. Therefore, the amount of charges Q(Cfb left) at the left terminal of the integrating capacitor Cfb is: Q(Cfb left)=VTX×C1+VRX×Cload.

Since the amount of charges at both terminals of the capacitor is equal, Q(Cfb right)=Vout×Cfb=Q(Cfb left)=VTX×C1+VRX×Cload. Therefore, for each integration, the integration step of the output terminal of operational amplifier 1 is: Vout=(VTX×C1+VRX×Cload)/Cfb. It can be seen that there is a deviation between the actual integration step and the theoretical integration step.

Figure 7:
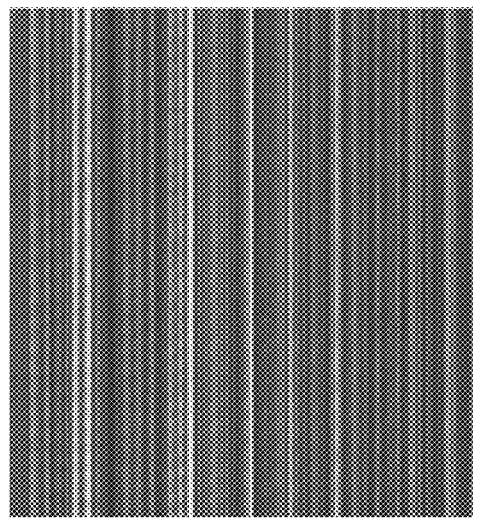
FIG. 7 is a fingerprint image obtained by a fingerprint recognition detection circuit, according to the related art.

Since the fingerprint recognition control chip includes a plurality of fingerprint recognition detection circuits 10', and in each fingerprint recognition detection circuit 10', process voltage drops in the operational amplifier 1 caused by a problem of the fabrication process are different. That is, for respective fingerprint recognition detection circuits 10', the parasitic capacitances Cload and mismatch voltages VRX at the RX nodes are all different, which will cause noises in the fingerprint image formed according to the detection signal output by the fingerprint recognition detection circuits 10'. For example, as shown in FIG. 7, there is vertical line noise in the collected fingerprint image.

Figure 2A:
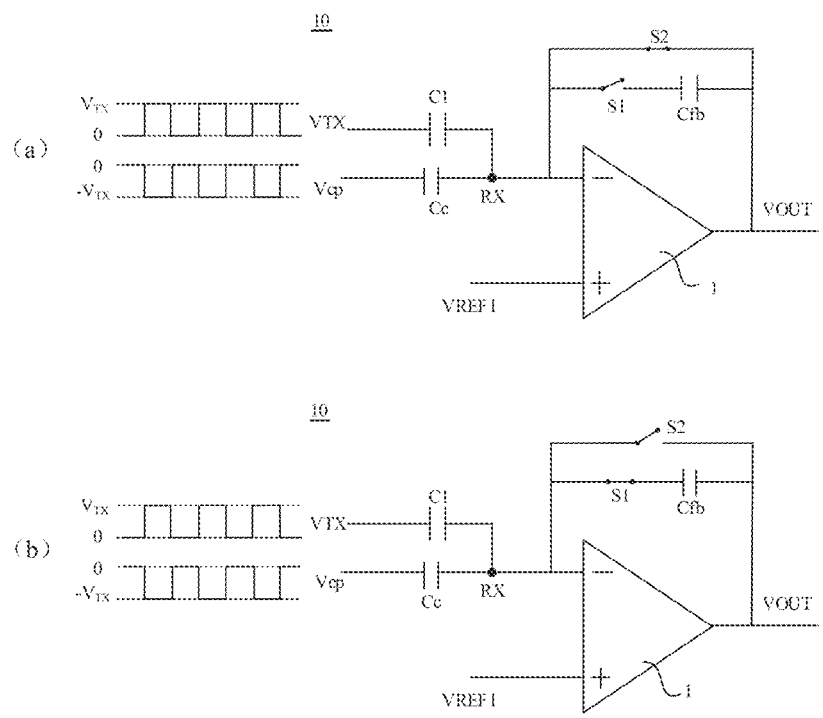
FIG. 2A is a diagram showing a structure of a fingerprint recognition detection circuit, according to some embodiments of the present disclosure.

On this basis, as shown in FIG. 2A, some embodiments of the present disclosure provide a fingerprint recognition detection circuit 10, which includes: an operational amplifier 1, an integrating capacitor Cfb, a first switch S1, and a second switch S2.

A non-inverting input terminal of the operational amplifier 1 is coupled to the reference voltage terminal VREF1, and an inverting input terminal of the operational amplifier 1 is coupled to the fingerprint sensing capacitor C1.

The integrating capacitor Cfb and the first switch S1 are connected in series, and the integrating capacitor Cfb and the first switch S1 connected in series are coupled between the inverting input terminal of the operational amplifier 1 and an output terminal of the operational amplifier 1.

The second switch S2 is coupled between the inverting input terminal of the operational amplifier 1 and the output terminal of the operational amplifier 1, and the second switch S2 is connected in parallel with the integrating capacitor Cfb and the first switch S1 connected in series.

The integrating capacitor Cfb is configured to discharge when the first switch S1 is opened and the second switch S2 is closed, and to store charges under an action of the fingerprint sensing capacitor C1 when the second switch S2 is opened and the first switch S1 is closed. That is, charges of the fingerprint sensing capacitor C1 are transferred to the integrating capacitor Cfb. The operational amplifier is configured to output a detection signal representing a capacitance value of the fingerprint sensing capacitor under an action of the integrating capacitor.

In the fingerprint recognition detection circuit 10, the operational amplifier 1 is a high-gain voltage amplifier with DC coupling, differential mode input, and single-ended output. The operational amplifier is connected to a capacitor or resistor in a specific connection mode, and can perform operations such as integration, differentiation, addition or subtraction. In the present disclosure, the integrating capacitor Cfb is coupled between the inverting input terminal and the output terminal of the operational amplifier 1. The integrating capacitor Cfb and the operational amplifier 1 together form an integrator. When the first switch S1 is closed, the integrating capacitor Cfb is connected with the inverting input terminal and the output terminal of the operational amplifier 1, and the integrator can perform integration on charges based on charging and discharging characteristics of the capacitor.

A control method of the fingerprint recognition detection circuit 10 is as follows.

As shown in (a) of FIG. 2A, the first switch S1 is opened and the second switch S2 is closed, so that the fingerprint recognition detection circuit 10 is in a reset state, and the integrating capacitor Cfb is discharged.

At this time, a voltage at the non-inverting input terminal of the operational amplifier 1 is the reference voltage Vref1. Under ideal conditions, potentials of the non-inverting input terminal and the inverting input terminal of the operational amplifier are equal, that is, "virtual short". However, due to the process voltage drop of the operational amplifier 1, there is a mismatch voltage VRX at the RX node. Therefore, a voltage at the inverting input terminal of the operational amplifier 1 is a sum of a voltage at the non-inverting input terminal and the mismatch voltage VRX at the RX node (VRX is a negative value). Since the second switch S2 is closed and the output terminal of the operational amplifier 1 is short-circuited with the inverting input terminal of the operational amplifier 1, the voltage at the output terminal of the operational amplifier 1 is equal to the voltage at its inverting input terminal (Vref1+VRX), so that the voltage at the output terminal of the operational amplifier 1 is reset.

As shown in (b) of FIG. 2A, the second switch is opened and the first switch is closed, so that the fingerprint recognition detection circuit is in an integration state, the integrating capacitor Cfb stores charges under the action of the fingerprint sensing capacitor C1, and the operational amplifier 1 outputs the detection signal representing the capacitance value of the fingerprint sensing capacitor C1 under the action of the integrating capacitor Cfb.

At this time, the voltages at the non-inverting input terminal and the inverting input terminal of operational amplifier 1 are unchanged: the voltage at the non-inverting input terminal of operational amplifier 1 is the reference voltage Vref1, and the voltage at the inverting input terminal of operational amplifier 1 is (Vref1+VRX). Since the first switch S1 is closed and the integrating capacitor Cfb is connected to the inverting input terminal and the output terminal of the operational amplifier 1, the integrator composed of the integrating capacitor Cfb and the operational amplifier 1 can perform integration operation. Therefore, the output terminal of the operational amplifier 1 outputs a voltage signal (i.e., an integration step) obtained after one integration operation, and the voltage signal is related to an amount of charges accumulated in the integrating capacitor Cfb. Detailed analysis is as follows.

In the fingerprint recognition detection circuit 10, in the reset phase, the first switch S1 is opened, the second switch S2 is closed, and the RX node is coupled to the input terminal of the operational amplifier 1 and the integrating capacitor Cfb (that is, the RX node is coupled to the integrator). Therefore, the amount of charges of the integral capacitor Cfb includes the amount of charges Q2 of the parasitic capacitance at the RX node, and the amount of charges Q(Cfb right) at the second terminal (right terminal) of the integrating capacitor Cfb is equal to a sum of a product of the voltage Vout at the output terminal of operational amplifier 1 and the capacitance value Cfb of the integrating capacitor Cfb, and the amount of charges Q2 of the parasitic capacitance at the RX node. That is, Q(Cfb right)=Vout×Cfb+Cload×VRx.

The amount of charges Q(Cfb left) at the first terminal (left terminal) of the integrating capacitor Cfb is equal to the amount of charges transferred from the fingerprint sensing capacitor C1 and the parasitic capacitance Cload at the RX node to the integrating capacitor Cfb. That is to say, in the integration phase, the amount of charges Q(Cfb left) at the left terminal of the integrating capacitor Cfb is equal to the sum of the amount of charges Q1 of the fingerprint sensing capacitor C1 and the amount of charges charge Q2 of the parasitic capacitance. The amount of charges Q1 of the fingerprint sensing capacitor C1 is equal to a product of the high level of the drive signal VTX and the capacitance C1 of the fingerprint sensing capacitor, and the amount of charges Q2 of the parasitic capacitance is equal to a product of the mismatch voltage VRX and the capacitance value Cload of the parasitic capacitance Cload. Therefore, the amount of charges Q(Cfb left) at the first terminal of the integrating capacitor Cfb is: Q(Cfb left)=VTX×C1+VRX×Cload.

Since the amount of charges at both terminals of the capacitor is equal, Q(Cfb right)=Vout×Cfb+Cload×VRx=Q(Cfb left)=VTX×C1+VRX×Cload, and therefore the amount of charges generated by the parasitic capacitance (VRX×Cload) is offset. Therefore, for each integration, the integration step of the output terminal of the operational amplifier 1 is: Vout=VTX×C1/Cfb. In this case, there is no deviation between the actual integration step and the theoretical integration step.

Figure 8:
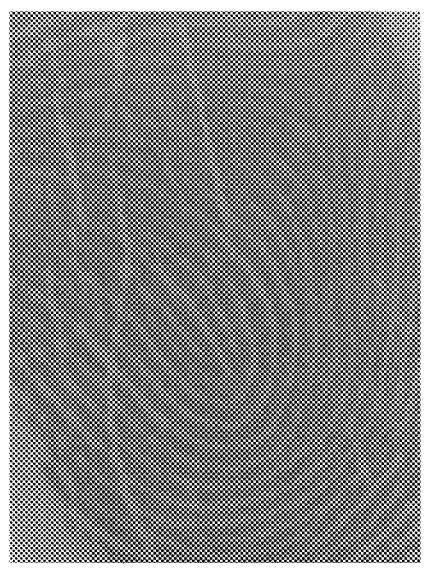
FIG. 8 is a fingerprint image obtained by a fingerprint recognition detection circuit, according to the present disclosure.

In this way, in a case where the fingerprint recognition detection circuit 10 is applied to a fingerprint recognition control chip 100, it can be known from the above analysis that, even though there are different process voltage drops in the operational amplifiers 1 in different fingerprint recognition detection circuits 10 due to problems in the fabrication process, since the RX node is coupled to the integrator composed of the integrating capacitor Cfb and the operational amplifier 1 in both the integration phase and the reset phase in the fingerprint recognition detection circuit 10 provided in the present disclosure, the charges at the first terminal and the charges at the second terminal of the integrating capacitor Cfb both include charges (VRX×Cload) generated by the parasitic capacitance, which can be offset. Therefore, the integration step output by the operational amplifier 1 has nothing to do with the parasitic capacitance, and is not affected by the process voltage drop. As a result, the detection signal representing the capacitance value of the fingerprint sensing capacitor C1 output by the fingerprint recognition detection circuit 10 is more accurate. In this way, it may be possible to avoid a problem of noise in the fingerprint image formed according to the detection signal output by the fingerprint recognition detection circuits 10, and improve an accuracy of the fingerprint recognition. For example, as shown in FIG. 8, the collected fingerprint image is relatively clear and accurate.

Figure 3:
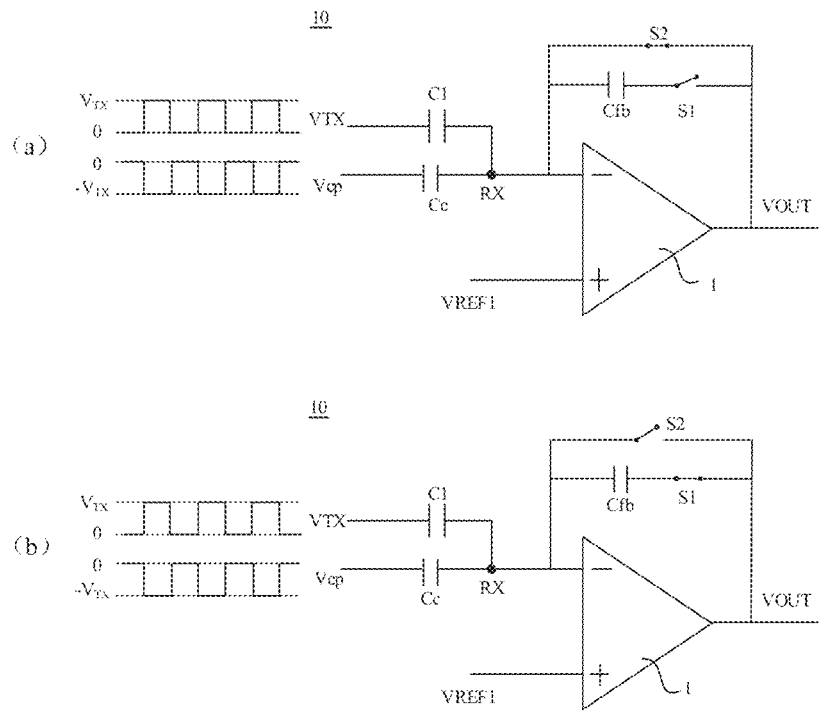
FIG. 3 is a diagram showing a structure of a fingerprint recognition control chip, according to some embodiments of the present disclosure.
Figure 3:
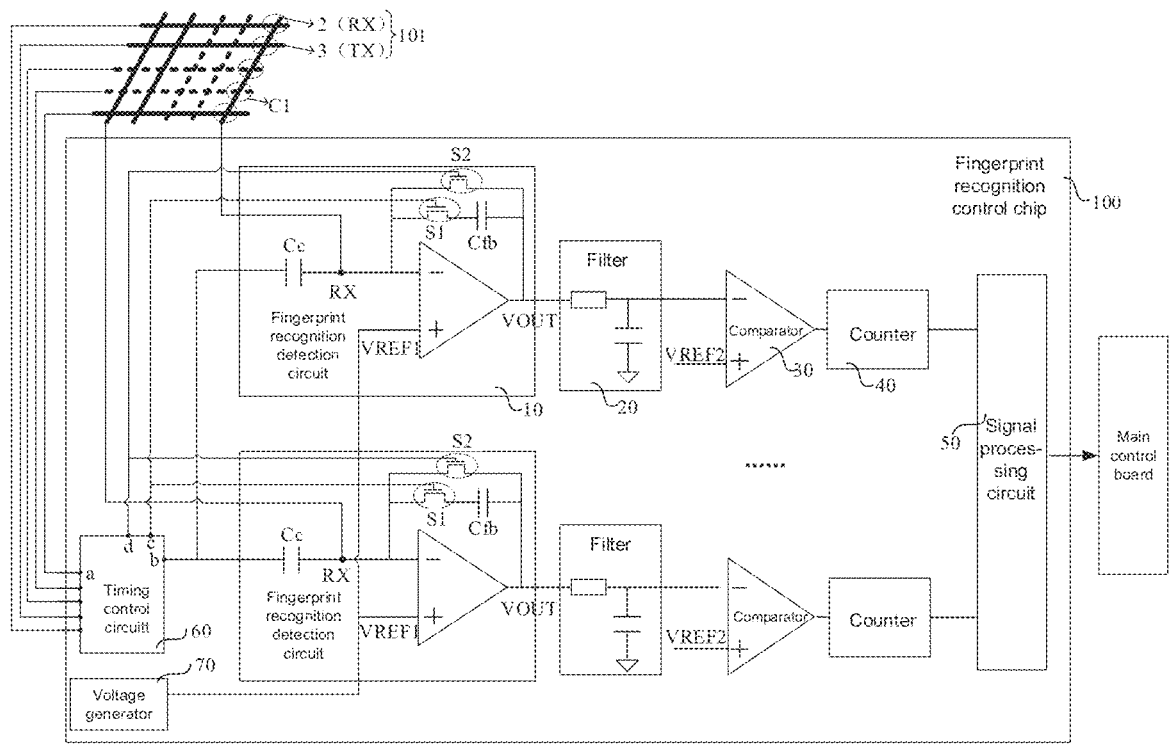

In some embodiments, as shown in FIGS. 2A and 3, the first switch S1 is arranged between the first terminal of the integrating capacitor Cfb and the inverting input terminal of the operational amplifier 1, and the first switch S1 includes a first transistor. A control electrode of the first transistor is coupled to a first control signal terminal c, a first electrode of the first transistor is coupled to the inverting input terminal of the operational amplifier 1, and a second electrode of the first transistor is coupled to the integrating capacitor Cfb. Or, as shown in FIG. 2B, the first switch S1 is arranged between the second terminal of the integrating capacitor Cfb and the output terminal of the operational amplifier 1; the control electrode of the first transistor is coupled to the first control signal terminal c, the first electrode of the first transistor is coupled to the integrating capacitor Cfb, and the second electrode of the first transistor is coupled to the output terminal of the operational amplifier 1.

That is, the first transistor may be located on a left side or a right side of the integrating capacitor Cfb. The first transistor is configured to be turned on under an action of a first control signal output from the first control signal terminal c, so that the first switch S1 is closed, and the integrating capacitor Cfb is coupled between the inverting input terminal and the output terminal of the operational amplifier 1 to perform the integration operation.

In some embodiments, as shown in FIG. 3, the second switch S2 includes a second transistor. A control electrode of the second transistor is coupled to a second control signal terminal d, a first electrode of the second transistor is coupled to the inverting input terminal of the operational amplifier 1, and a second electrode of the second transistor is coupled to the output terminal of the operational amplifier 1.

The second transistor is configured to be turned on under an action of a second control signal output from the second control signal terminal d, so that the second switch S2 is closed, and the inverting input terminal of the operational amplifier 1 is coupled to the output terminal of the operational amplifier 1 to reset the integrator composed of the integrating capacitor Cfb and the operational amplifier 1.

In some embodiments, as shown in FIGS. 2A and 3, a first terminal of the fingerprint sensing capacitor C1 is coupled to a drive signal terminal a, and a second terminal of the fingerprint sensing capacitor C1 is coupled to the inverting input terminal of the operational amplifier 1. The first terminal of the fingerprint sensing capacitor C1 receives a drive signal VTX transmitted by the drive signal terminal a, and a voltage at the second terminal of the fingerprint sensing capacitor C1 changes as a voltage at the first terminal changes under a bootstrap action of the capacitor, and then the charges are transferred to the integral capacitance Cfb.

As shown in FIGS. 2A and 3, the fingerprint recognition detection circuit 10 further includes: a compensation capacitor Cc. A first terminal of the compensation capacitor Cc is coupled to a compensation signal terminal b, and a second terminal of the compensation capacitor Cc is coupled to the inverting input terminal of the operational amplifier 1. The first terminal of the compensation capacitor Cc receives a compensation signal from the compensation signal terminal b, and the received compensation signal from the compensation signal terminal b has an opposite phase to a drive signal from the drive signal terminal a received by the first terminal of the fingerprint sensing capacitor C1. The compensation capacitor Cc is configured to offset at least a part of an original capacitance value of the fingerprint sensing capacitor C1. The original capacitance value is a capacitance value of the fingerprint sensing capacitor C1 when not affected by a fingerprint.

As shown in FIG. 2A, the first terminal of the compensation capacitor Cc receives the compensation signal Vcp from the compensation signal terminal b. For example, the compensation signal Vcp is a square wave signal with a duty ratio of 50%, and levels of the square wave signal alternate between a first level (for example, 0V) and a second level (for example, −VTX). The compensation signal Vcp and the drive signal VTX have opposite phases.

In the fingerprint recognition detection circuit 10 described above, in a single reset and integration process, the amount of charges Q(Cfb right) at the second terminal (right terminal) of the integrating capacitor Cfb is: Q(Cfb right)=Vout×Cfb+Cload×VRx. Since the compensation capacitor Cc is added to the circuit, the amount of charges Q(Cfb left) at the first terminal (left terminal) of the integrating capacitor Cfb is equal to a sum of the amount of charges transferred from the fingerprint sensing capacitor C1, the compensation capacitor Cc, and the parasitic capacitance at the RX node to the integrating capacitor Cfb. That is, the amount of charges Q(Cfb left) at the first terminal of the integrating capacitor Cfb is: Q(Cfb left)=VTX×C1+ VRX×Cload+(−VTX)×Cc. Herein, Cc is a capacitance value of the compensation capacitor Cc.

Since the amount of charges at both terminals of the capacitor is equal, Q(Cfb right)=Vout×Cfb+Cload×VRx=Q (Cfb left)=VTX×C1+VRX×Cload+(−VTX)×Cc, for each integration, the integration step of the output terminal of operational amplifier 1 is: Vout=[VTX×C1+(−VTX)×Cc]/ Cfb=[VTX×(C1−Cc)]/Cfb.

The capacitance value of the fingerprint sensing capacitor C1 changes under the influence of the finger, therefore the capacitance value C1 of the fingerprint sensing capacitor C1 includes its original capacitance value Cs and a capacitance change ΔC. That is, C1=Cs+ΔC. Therefore, the integration step at the output terminal of operational amplifier 1 is: Vout=[VTX×(C1−Cc)]/Cfb=[VTX×(Cs+ΔC−Cc)]/Cfb. The capacitance value Cc of the compensation capacitor Cc offsets at least a part of the original capacitance value Cs of the fingerprint sensing capacitance C1, so that a correlation between the integration step of the output terminal of the operational amplifier 1 and the capacitance change ΔC of the fingerprint sensing capacitor C1 increases. As a result, the detection signal representing the capacitance value of the fingerprint sensing capacitor C1 output by the fingerprint recognition detection circuit 10 is more accurate.

In some embodiments, the capacitance value Cc of the compensation capacitor Cc is equal to the original capacitance value Cs of the fingerprint sensing capacitor C1.

Since the capacitance value Cc of the compensation capacitor Cc is equal to the original capacitance value Cs of the fingerprint sensing capacitor C1, the integration step of the output terminal of operational amplifier 1 is: Vout= (VTX×ΔC)/Cfb. The correlation between the integration step and the capacitance change ΔC of the fingerprint sensing capacitor C1 further increases. Therefore, the detection signal output by the fingerprint recognition detection circuit 10 may be able to reflect the capacitance change of the fingerprint recognition capacitor more accurately, and thus it may be possible to identify a corresponding position to be a ridge or valley of a fingerprint more accurately according to the detection signal.

As shown in FIG. 3, some embodiments of the present disclosure further provide a fingerprint recognition control chip 100, which includes: at least one fingerprint recognition detection circuit 10 as provided in some embodiments of the present disclosure.

Each fingerprint recognition detection circuit 10 in the fingerprint recognition control chip 100 is coupled to its corresponding fingerprint sensing capacitor C1. Each fingerprint recognition detection circuit 10 senses a change in the capacitance value of the fingerprint sensing capacitor C1 to which the fingerprint recognition detection circuit is coupled, outputs the detection signal representing the capacitance value of the fingerprint sensing capacitor C1, and forms a fingerprint image according to voltage values of respective detection signals, thereby achieving fingerprint recognition.

The fingerprint recognition control chip 100 provided in the present disclosure includes at least one fingerprint recognition detection circuit 10 as provided in some embodiments of the present disclosure, and performs fingerprint recognition according to the detection signal output by the at least one fingerprint recognition detection circuit 10, with an improved accuracy.

In some embodiments, as shown in FIG. 3, the fingerprint recognition control chip 100 further includes a timing control circuit 60. The timing control circuit 60 has a plurality of drive signal terminals a, and each drive signal terminal a is coupled to at least one fingerprint sensing capacitor C1. The timing control circuit 60 is configured to generate a drive signal, and transmit the drive signal to the at least one fingerprint sensing capacitor C1 through the drive signal terminal a.

For example, as shown in FIG. 3, a plurality of fingerprint sensing capacitors C1 are arranged in an array. Each drive signal terminal a is coupled to first terminals of fingerprint sensing capacitors C1 in a same row through a signal line, and transmits drive signals to multiple fingerprint sensing capacitors C1 in the same row. Such a drive signal terminal a can simultaneously transmit drive signals to multiple fingerprint sensing capacitors C1, which reduces the number of drive signal terminals a and saves costs.

Or, for example, each drive signal terminal a is coupled to a single fingerprint sensing capacitor C1 through a signal line, and transmits a drive signal to the fingerprint sensing capacitor C1. In this way, the drive signal can be transmitted to the corresponding fingerprint sensing capacitor C1 more accurately.

In some embodiments, as shown in FIG. 3, in a case where the fingerprint recognition detection circuit 10 further includes a compensation capacitor Cc, the timing control circuit 60 further has a compensation signal terminal b. The timing control circuit 60 is further configured to generate a compensation signal, and transmit the compensation signal to the compensation capacitor Cc of the fingerprint recognition detection circuit 10 through the compensation signal terminal b.

Both the drive signal and the compensation signal are generated by the timing control circuit 60, so that the timing control circuit 60 can accurately control the phases of the generated drive signal and compensation signal to be opposite.

In some embodiments, as shown in FIG. 3, in a case where the fingerprint recognition circuit includes a first transistor and a second transistor, the timing control circuit 60 further has a first control signal terminal c and a second control signal terminal d.

The timing control circuit 60 is further configured to generate a first control signal and a second control signal, and transmit the first control signal to the first transistor through the first control signal terminal c, and transmit the second control signal to the second transistor through the second control signal terminal d.

The first control signal and the second control signal generated by the timing control circuit 60 control the on and off states of the first transistor and the second transistor, thereby controlling the reset and integration of the fingerprint recognition detection circuit 10.

In some embodiments, as shown in FIG. 3, the fingerprint recognition control chip 100 further includes a voltage generator 70, and the voltage generator 70 has a reference voltage terminal VREF1. The power circuit voltage generator 70 is configured to generate a reference voltage signal, and transmit the reference voltage signal to the non-inverting input terminal of the operational amplifier 1 of the fingerprint recognition detection circuit 10 through the reference voltage terminal VREF1.

As shown in FIG. 3, in some embodiments, the fingerprint recognition control chip 100 further includes: at least one filter 20, at least one comparator 30 and at least one counter 40. One filter 20, one comparator 30, and one counter 40 are sequentially connected in series, and the filter 20 is coupled to the output terminal of the operational amplifier 1 of the fingerprint recognition detection circuit 10.

The filter 20 is configured to denoise a detection signal output by the fingerprint recognition detection circuit 10.

The comparator 30 is configured to compare a voltage value of a signal output by the filter 20 with a preset voltage value, and to output an enable signal if the voltage value of the signal output by the filter 20 is larger than the preset voltage value (for example, Vref2). For example, the preset voltage value is a voltage value output by the fingerprint recognition detection circuit 10 after resetting and integrating for a preset number of times (for example, 8 times) in a case where the capacitance value of the fingerprint sensing capacitor C1 does not change under the influence of a fingerprint.

The counter 40 is configured to stop counting and to output a counting result under control of the enable signal.

The fingerprint recognition control chip 100 further includes a signal processing circuit 50. The signal processing circuit 50 is coupled to the counter 40, and is configured to process the signal counting result output by the counter 40, and to output voltage signal representing fingerprint image data.

In the fingerprint recognition control chip 100 described above, the fingerprint recognition detection circuit 10, the filter 20, the comparator 30 and the counter 40 are equal in number, and one fingerprint recognition detection circuit 10, one filter 20, one comparator 30 and one counter 40 are sequentially connected in series. The fingerprint recognition detection circuit 10 repeats the reset and integration operations, and outputs the detection signal representing the capacitance value of the fingerprint sensing capacitor C1. After being denoised by the filter 20, the detection signal is input to the comparator 30 and is compared with the preset voltage value in the comparator 30, until the comparator 30 outputs the enable signal. The counter 40 stops counting and outputs the counting result under the control of the enable signal.

For example, a working process of the fingerprint recognition control chip 100 is as follows. The fingerprint sensing capacitor C1 senses a capacitance change caused the valley or ridge of the fingerprint of a finger. For example, under the influence of the finger, the capacitance value of the fingerprint sensing capacitor C1 decreases, and the capacitance value is more affected by the ridge than by the valley. That is, when the finger presses on a sensing substrate 101, a capacitance value of a fingerprint sensing capacitor C1 corresponding to the ridge of the fingerprint is smaller than a capacitance value of a fingerprint sensing capacitor C1 corresponding to the valley of the fingerprint. Moreover, the detection signal output by the fingerprint recognition detection circuit 10 is related to the capacitance value of the fingerprint sensing capacitor C1. For example, in a case where the detection signal output by the fingerprint recognition detection circuit 10 is positively correlated with the capacitance value of the fingerprint sensing capacitor C1, a voltage value of a detection signal corresponding to the ridge of the fingerprint is smaller than a voltage value of a detection signal corresponding to the valley of the fingerprint.

In this way, in the fingerprint recognition control chip 100, the detection signals output by the fingerprint recognition detection circuits 10 are different. After being filtered by the filter 20, the detection signals are input into the comparator 30. The voltage value of the detection signal corresponding to the ridge of the fingerprint is smaller than the voltage of the detection signal corresponding to the valley of the fingerprint. Therefore, the voltage value of the detection signal corresponding to the valley of the fingerprint can reach the preset voltage value faster (that is, through less reset and integration processes) than the detection signal corresponding to the ridge of the fingerprint to cause the comparator 30 to output an enable signal to make the counter 40 stop counting. Therefore, a counting value corresponding to the valley of the fingerprint is smaller than a counting value corresponding to the ridge of the fingerprint. In this way, the counting results output by the counters 40 each represent fingerprint information of the corresponding position. The signal processing circuit 50 processes the counting results output by the counters 40 and output the voltage signal representing the fingerprint image data, thereby realizing fingerprint recognition.

Figure 4:
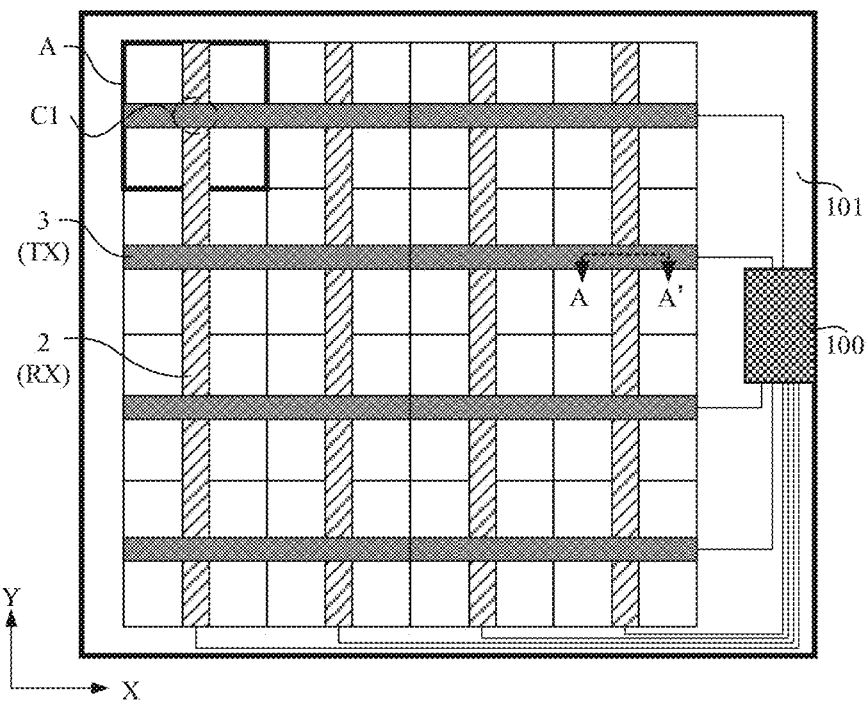
FIG. 4 is a diagram showing a structure of a fingerprint recognition apparatus, according to some embodiments of the present disclosure.

As shown in FIG. 4, some embodiments of the present disclosure further provide a fingerprint recognition apparatus 200, which includes a sensing substrate 101 and the fingerprint recognition control chip 100 provided in the embodiments of the present disclosure.

The sensing substrate 101 has a plurality of sensing regions A. Each sensing region A is provided therein with at least one fingerprint sensing capacitor C1, and each fingerprint sensing capacitor C1 is coupled to the fingerprint recognition control chip 100. The fingerprint sensing capacitor C1 is configured to sense a change in a capacitance value caused by a valley or a ridge in a fingerprint.

By providing a plurality of sensing regions A in the sensing substrate 101, when a finger presses on the sensing substrate 101, the at least one fingerprint sensing capacitor C1 in each sensing region A can sense the change in the capacitance value caused by the valley or ridge in the fingerprint. For example, the capacitance value of the fingerprint sensing capacitor C1 corresponding to the ridge of the fingerprint is smaller than the capacitance value of the fingerprint sensing capacitor C1 corresponding to the valley of the fingerprint; the fingerprint recognition control chip 100 obtains the changes in the capacitance values of multiple fingerprint sensing capacitors C1, so as to know which sensing regions A correspond to the ridges or valleys of the fingerprint, thereby obtaining the fingerprint information.

Figure 5:
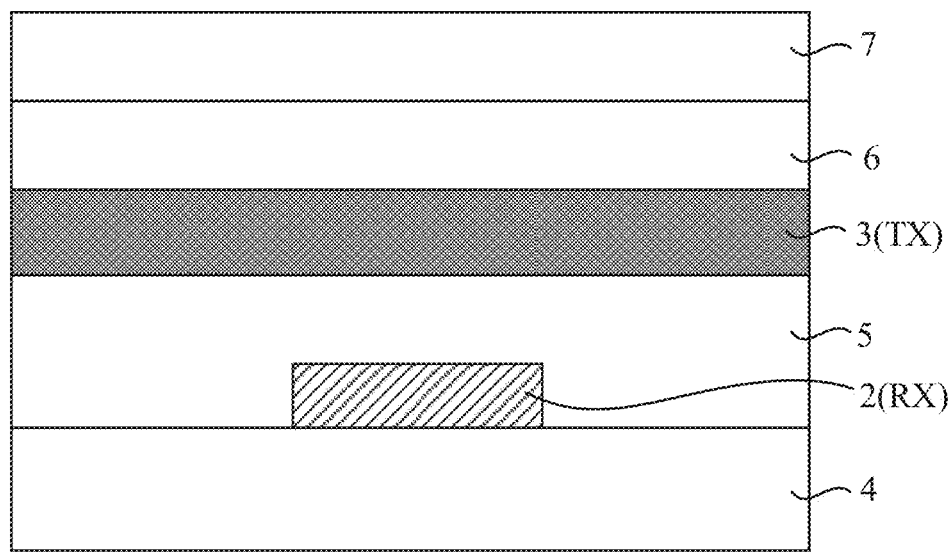
FIG. 5 is a sectional view taken along a sectional line AA shown in FIG. 4.

In some embodiments, as shown in FIGS. 4 and 5, the plurality of sensing regions A are arranged in an array. The sensing substrate 101 includes: a base substrate 4, a plurality of first electrodes 2 and a plurality of second electrodes 3.

The plurality of first electrodes 2 are arranged on a side of the base substrate 4, and the plurality of first electrodes 2 extend in a first direction Y and are arranged at intervals in a second direction X. The plurality of second electrodes 3 are arranged on sides of the plurality of first electrodes 2 away from the base substrate, and the plurality of second electrodes 3 extend in the second direction X and are arranged at intervals in the first direction Y.

The plurality of first electrodes 2 and the plurality of second electrodes 3 are insulated from each other. A plurality of fingerprint sensing capacitors C1 are formed at intersections of the plurality of first electrodes 2 and the plurality of second electrodes 3.

The first direction Y intersects the second direction X. For example, as shown in FIG. 4, the first direction Y and the second direction X are perpendicular to each other; the first direction Y is a column direction, and the second direction X is a row direction.

In the above embodiments, the plurality of fingerprint sensing capacitors C1 are formed at intersections of the plurality of first electrodes 2 and the plurality of second electrodes 3. For example, as shown in FIG. 4, the sensing substrate 101 has N×M sensing regions A arranged in an array. The sensing substrate 101 includes N first electrodes 2 and M second electrodes 3, and a plurality of fingerprint sensing capacitors C1 are formed at intersections of the N first electrodes 2 and the M second electrodes 3. In this way, each sensing region A is provided therein with one fingerprint sensing capacitor C1.

One first electrode 2 and M second electrodes 3 form M fingerprint sensing capacitors C1 in a same column, and one second electrode 3 and N first electrodes 2 form N fingerprint sensing capacitors C1 in a same row. In this way, it is convenient to control voltages at two terminals of respective fingerprint sensing capacitors C1. The first terminal of the fingerprint sensing capacitor C1 mentioned above is a second electrode 3 corresponding to the fingerprint sensing capacitor C1, and the second terminal of the fingerprint sensing capacitor C1 is a first electrode 2 corresponding to the fingerprint sensing capacitor C1.

In some embodiments, as shown in FIG. 3, the first electrode 2 is coupled to the inverting input terminal of the operational amplifier 1 of the fingerprint recognition detection circuit 10 in the fingerprint recognition control chip 100.

In other words, one fingerprint recognition detection circuit 10 is coupled to M fingerprint sensing capacitors C1 formed by one first electrode 2 and M second electrodes 3, and each fingerprint recognition detection circuit 10 controls a collection of capacitance values of a column of fingerprint sensing capacitors C1.

As shown in FIG. 3, in some embodiments, in a case where the fingerprint recognition control chip 100 further includes a timing control circuit 60, the plurality of second electrodes 3 are coupled with the timing control circuit 60. The timing control circuit 60 is configured to transmit drive signals to the plurality of second electrodes 3 row by row.

For example, the plurality of second electrodes 3 are correspondingly coupled to a plurality of drive signal terminals a of the timing control circuit 60. For example, the timing control circuit 60 has M drive signal terminals a, and each drive signal terminal a is coupled with one second electrode 3; the plurality of drive signal terminals a of the timing control circuit 60 output drive signals one by one, so as to transmit the drive signals to the plurality of second electrodes 3 row by row. In this way, the plurality of second electrodes 3 and the plurality of first electrodes 2 sequentially form the fingerprint sensing capacitors C1. Therefore, in a column of fingerprint sensing capacitors C1 coupled to the fingerprint recognition detection circuit 10, the fingerprint recognition detection circuit 10 may be able to sequentially collect the capacitance value of each fingerprint sensing capacitor C1 in the column of fingerprint sensing capacitors C1, and thereby output detection signals representing the capacitance values of respective fingerprint sensing capacitors C1.

In some examples, as shown in FIG. 5, the sensing substrate 101 further includes: a first insulating layer 5, a second insulating layer 6 and a protective cover 7.

The first insulating layer 5 is arranged between the plurality of first electrodes 2 and the plurality of second electrodes 3. The second insulating layer 6 is arranged on sides of the plurality of second electrodes 3 away from the base substrate 4, and the protective cover 7 is arranged on a side of the second insulating layer away from the base substrate 4.

Materials of the first insulating layer 5 and the second insulating layer 6 are not limited, as long as they have good insulating properties. For example, the materials of the first insulating layer 5 and the second insulating layer 6 are resin, silicon dioxide, etc. Serving as a cover of the sensing substrate 101, the protective cover 7 can protect other film layers of the sensing substrate 101. For example, the protective cover 7 is a glass cover, a ceramic cover, etc.

Figure 6:
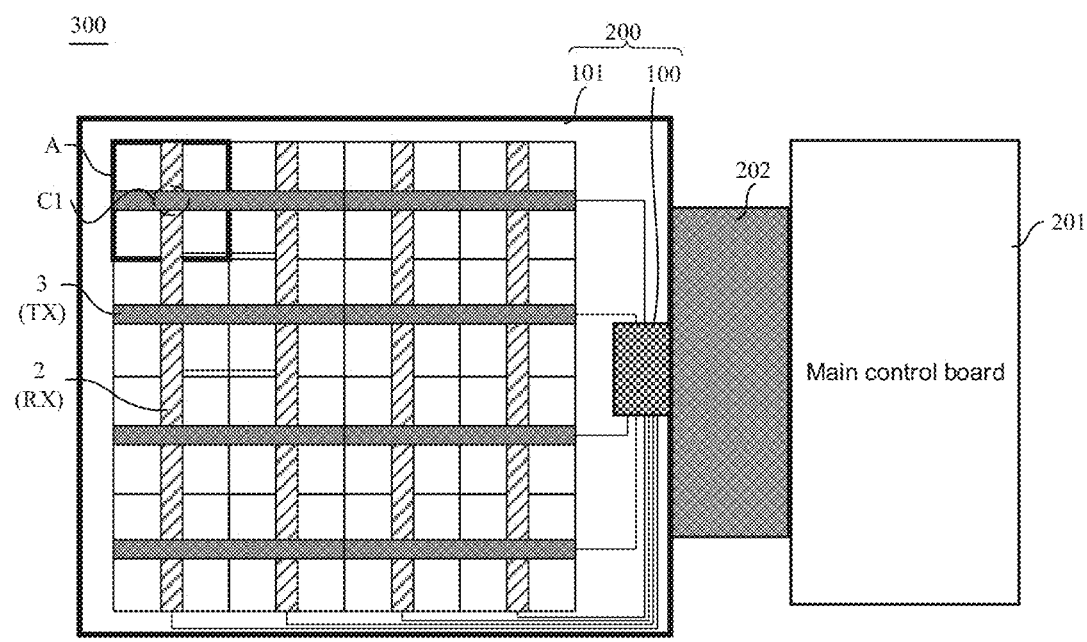
FIG. 6 is a diagram showing a structure of a fingerprint lock, according to some embodiments of the present disclosure.

As shown in FIG. 6, some embodiments of the present disclosure further provide a fingerprint lock 300, which includes a lock body, the fingerprint recognition apparatus 200, and a main control board 201.

The lock body and the fingerprint recognition apparatus 200 are respectively coupled to the main control board 201. For example, the lock body and the fingerprint recognition apparatus 200 are respectively coupled to the main control board 201 through a flexible circuit board 202. The main control board 201 is configured to receive voltage information representing fingerprint image data from the fingerprint recognition apparatus 200, to generate a fingerprint image according to the voltage information, and to compare the generated fingerprint image with an original fingerprint image to determine whether to unlock or not.

The fingerprint lock 300 provided in the present disclosure includes the fingerprint recognition apparatus 200 provided in the present disclosure and has the same technical effects as those the fingerprint recognition apparatus 200, and details will not be repeated here.

The fingerprint recognition apparatus 200 provided in the embodiments of the present disclosure can also be applied to attendance machines, smart phones, tablet computers, safes, etc., which is not limited in the present disclosure.

The foregoing descriptions are merely specific implementations of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A fingerprint recognition detection circuit, comprising:
an operational amplifier, a non-inverting input terminal of the operational amplifier being coupled to a reference voltage terminal, and an inverting input terminal of the operational amplifier being coupled to a fingerprint sensing capacitor; wherein a first terminal of the fingerprint sensing capacitor is coupled to a drive signal terminal, and a second terminal of the fingerprint sensing capacitor is coupled to the inverting input terminal of the operational amplifier;
an integrating capacitor and a first switch connected in series, the integrating capacitor and the first switch being coupled between the inverting input terminal of the operational amplifier and an output terminal of the operational amplifier;
a second switch, the second switch being coupled between the inverting input terminal of the operational amplifier and the output terminal of the operational amplifier, and the second switch being connected in parallel with the integrating capacitor and the first switch connected in series; and
a compensation capacitor, wherein a first terminal of the compensation capacitor is coupled to a compensation signal terminal, and a second terminal of the compensation capacitor is coupled to the inverting input terminal of the operational amplifier;
wherein the integrating capacitor is configured to discharge when the first switch is opened and the second switch is closed, and to store charges under an action of the fingerprint sensing capacitor when the second switch is opened and the first switch is closed;
the operational amplifier is configured to output a detection signal representing a capacitance value of the fingerprint sensing capacitor under an action of the integrating capacitor;
a compensation signal from the compensation signal terminal received by the first terminal of the compensation capacitor has an opposite phase to a drive signal from the drive signal terminal received by the first terminal of the fingerprint sensing capacitor; the compensation capacitor is configured to offset at least a part of an original capacitance value of the fingerprint sensing capacitor; and
the original capacitance value is a capacitance value of the fingerprint sensing capacitor when not affected by a fingerprint.

2. The fingerprint recognition detection circuit according to claim 1, wherein the first switch includes a first transistor;
a control electrode of the first transistor is coupled to a first control signal terminal, a first electrode of the first transistor is coupled to the inverting input terminal of the operational amplifier, and a second electrode of the first transistor is coupled to the integrating capacitor.

3. The fingerprint recognition detection circuit according to claim 1, wherein the first switch includes a first transistor;
a control electrode of the first transistor is coupled to a first control signal terminal, a first electrode of the first transistor is coupled to the integrating capacitor, and a second electrode of the first transistor is coupled to the output terminal of the operational amplifier.

4. The fingerprint recognition detection circuit according to claim 1, wherein the second switch includes a second transistor;
a control electrode of the second transistor is coupled to a second control signal terminal, a first electrode of the second transistor is coupled to the inverting input terminal of the operational amplifier, and a second electrode of the second transistor is coupled to the output terminal of the operational amplifier.

5. The fingerprint recognition detection circuit according to claim 1, wherein a capacitance value of the compensation capacitor is equal to the original capacitance value of the fingerprint sensing capacitor.

6. A fingerprint recognition control chip, comprising: at least one fingerprint recognition detection circuit according to claim 1.

7. The fingerprint recognition control chip according to claim 6, further comprising: a timing control circuit, wherein the timing control circuit has a plurality of drive signal terminals, and each drive signal terminal is coupled to at least one fingerprint sensing capacitor; and
the timing control circuit is configured to generate a drive signal, and transmit the drive signal to the at least one fingerprint sensing capacitor through the drive signal terminal.

8. The fingerprint recognition control chip according to claim 7, wherein in a case where the fingerprint recognition detection circuit further comprises a compensation capacitor, the timing control circuit further has a compensation signal terminal; and
the timing control circuit is further configured to generate a compensation signal, and transmit the compensation signal to the compensation capacitor of the fingerprint recognition detection circuit through the compensation signal terminal.

9. The fingerprint recognition control chip according to claim 7, wherein in a case where the fingerprint recognition circuit includes a first transistor and a second transistor, the timing control circuit further has a first control signal terminal and a second control signal terminal; and
the timing control circuit is further configured to generate a first control signal and a second control signal, and transmit the first control signal to the first transistor through the first control signal terminal and the second control signal to the second transistor through the second control signal terminal.

10. The fingerprint recognition control chip according to claim 6, further comprising: a voltage generator, wherein the voltage generator has a reference voltage terminal; and
the voltage generator is configured to generate a reference voltage signal, and transmit the reference voltage signal to the non-inverting input terminal of the operational amplifier of the fingerprint recognition detection circuit through the reference voltage terminal.

11. The fingerprint recognition control chip according to claim 6, further comprising: at least one filter, at least one comparator and at least one counter, wherein
one filter, one comparator, and one counter are sequentially connected in series, and the filter is coupled to the output terminal of the operational amplifier of the fingerprint recognition detection circuit;
the filter is configured to denoise a detection signal output by the fingerprint recognition detection circuit;
the comparator is configured to compare a voltage value of a signal output by the filter with a preset voltage value, and to output an enable signal if the voltage value of the signal output by the filter is larger than the preset voltage value; and
the counter is configured to stop counting and output a counting result under control of the inversion signal.

12. The fingerprint recognition control chip according to claim 11, further comprising: a signal processing circuit, wherein the signal processing circuit is coupled to counters; and the signal processing circuit is configured to process the counting result output by the counter, and to output a voltage signal representing fingerprint image data.

13. A fingerprint recognition apparatus, comprising: a sensing substrate and the fingerprint recognition control chip according to claim 6, wherein the sensing substrate has a plurality of sensing regions; each sensing region is provided therein with at least one fingerprint sensing capacitor, and each fingerprint sensing capacitor is coupled to the fingerprint recognition control chip; and the fingerprint sensing capacitor is configured to sense a change in a capacitance value caused by a valley or ridge in a fingerprint.

14. The fingerprint recognition apparatus according to claim 13, wherein the plurality of sensing regions are arranged in an array; and the sensing substrate includes:
a base substrate;
a plurality of first electrodes arranged on a side of the base substrate, the plurality of first electrodes extending in a first direction and being arranged at intervals in a second direction; and a plurality of second electrodes arranged on sides of the plurality of first electrodes away from the base substrate, the plurality of second electrodes extending in the second direction and being arranged at intervals in the first direction; wherein the plurality of first electrodes and the plurality of second electrodes are insulated from each other; and a plurality of fingerprint sensing capacitors are formed at intersections of the plurality of first electrodes and the plurality of second electrodes; and the first direction intersects the second direction.

15. The fingerprint recognition apparatus according to claim 14, wherein each of the plurality of first electrodes is coupled to the inverting input terminal of the operational amplifier of a corresponding fingerprint recognition detection circuit in the fingerprint recognition control chip.

16. The fingerprint recognition apparatus according to claim 14, wherein in a case where the fingerprint recognition control chip further comprises a timing control circuit, the plurality of second electrodes are coupled with the timing control circuit; and the timing control circuit is configured to transmit drive signals to the plurality of second electrodes row by row.

17. The fingerprint recognition apparatus according to claim 13, wherein the sensing substrate further includes:

a first insulating layer arranged between the plurality of first electrodes and the plurality of second electrodes;

a second insulating layer arranged on sides of the plurality of second electrodes away from the base substrate; and a third electrode layer arranged on a side of the second insulating layer away from the base substrate.

18. A control method applied to a fingerprint recognition detection circuit, wherein the fingerprint recognition detection circuit includes:

an operational amplifier, a non-inverting input terminal of the operational amplifier being coupled to a reference voltage terminal, and an inverting input terminal of the operational amplifier being coupled to a fingerprint sensing capacitor; wherein a first terminal of the fingerprint sensing capacitor is coupled to a drive signal terminal, and a second terminal of the fingerprint sensing capacitor is coupled to the inverting input terminal of the operational amplifier;

an integrating capacitor and a first switch connected in series, the integrating capacitor and the first switch being coupled between the inverting input terminal of the operational amplifier and an output terminal of the operational amplifier;

a second switch, the second switch being coupled between the inverting input terminal of the operational amplifier and the output terminal of the operational amplifier, and the second switch being connected in parallel with the integrating capacitor and the first switch connected in series; and a compensation capacitor, wherein a first terminal of the compensation capacitor is coupled to a compensation signal terminal, and a second terminal of the compensation capacitor is coupled to the inverting input terminal of the operational amplifier;

wherein the integrating capacitor is configured to discharge when the first switch is opened and the second switch is closed, and to store charges under an action of the fingerprint sensing capacitor when the second switch is opened and the first switch is closed;

the operational amplifier is configured to output a detection signal representing a capacitance value of the fingerprint sensing capacitor under an action of the integrating capacitor;

a compensation signal from the compensation signal terminal received by the first terminal of the compensation capacitor has an opposite phase to a drive signal from the drive signal terminal received by the first terminal of the fingerprint sensing capacitor; the compensation capacitor is configured to offset at least a part of an original capacitance value of the fingerprint sensing capacitor; and the original capacitance value is a capacitance value of the fingerprint sensing capacitor when not affected by a fingerprint;

wherein the control method comprises:

opening the first switch and closing the second switch, so that the fingerprint recognition detection circuit is in a reset state, and the integrating capacitor of the fingerprint recognition detection circuit is discharged; and opening the second switch and closing the first switch, so that the fingerprint recognition detection circuit is in an integration state, the integrating capacitor of the fingerprint recognition detection circuit stores charges under the action of the fingerprint sensing capacitor, and the operational amplifier outputs the detection signal representing the capacitance value of the fingerprint sensing capacitor under the action of the integrating capacitor.

* * * * *